(12) United States Patent
Seki (10) Patent No.: US 10,341,821 B2
(45) Date of Patent: Jul. 2, 2019

(54) BASE STATION AND TRANSMISSION METHOD

(71) Applicant: Panasonic Intellectual Property Management Co., Ltd., Osaka (JP)

(72) Inventor: Yuta Seki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/502,878

(22) PCT Filed: Nov. 5, 2015

(86) PCT No.: PCT/JP2015/005542
§ 371 (c)(1),
(2) Date: Feb. 9, 2017

(87) PCT Pub. No.: WO2016/088297
PCT Pub. Date: Jun. 9, 2016

(65) Prior Publication Data
US 2017/0237534 A1    Aug. 17, 2017

(30) Foreign Application Priority Data
Dec. 3, 2014  (JP) .................................. 2014-245046

(51) Int. Cl.
*H04W 40/16* (2009.01)
*H04W 4/06* (2009.01)
(Continued)

(52) U.S. Cl.
CPC .............. *H04W 4/06* (2013.01); *H04L 5/0032* (2013.01); *H04W 16/02* (2013.01);
(Continued)

(58) Field of Classification Search
CPC ... H04W 4/06; H04W 28/0236; H04W 40/16; H04W 72/082
See application file for complete search history.

(56) References Cited

U.S. PATENT DOCUMENTS

| | | | |
|---|---|---|---|
| 9,036,483 B2 | 5/2015 | Takahashi et al. | |
| 2013/0114498 A1* | 5/2013 | Park | H04W 4/06 370/312 |

(Continued)

FOREIGN PATENT DOCUMENTS

| | | |
|---|---|---|
| JP | 2006-254179 A | 9/2006 |
| JP | 2012-090121 A | 5/2012 |
| WO | 2012/053574 A1 | 4/2012 |

OTHER PUBLICATIONS

3GPP TS 36.300 V10.10.1, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRA); Overall description; Stage 2 (Release 10)," Jun. 2013, 194 pages.

(Continued)

*Primary Examiner* — Ashley Shivers
(74) *Attorney, Agent, or Firm* — Seed IP Law Group LLP (57) ABSTRACT

Multicast transmission and inter-cell interference coordination can be flexibly switched using Multicast-Broadcast Single Frequency Network (MBSFN) subframe without reduction of resource utilization efficiency. A transmission data determination unit determines that a first area is used as either of a first subframe performing multicast transmission or a second subframe performing inter-cell interference coordination based on presence or absence of transmission data in each of the first area which is configured to have at least some subframes among a plurality of MBSFN sub- (Continued)

frames. Wireless communication IF unit performs a transmission process in the first area according to a determination result.

16 Claims, 7 Drawing Sheets

(51) Int. Cl.
    *H04W 28/02*     (2009.01)
    *H04W 16/02*     (2009.01)
    *H04L 5/00*     (2006.01)
    *H04W 72/04*     (2009.01)
    *H04W 72/00*     (2009.01)
    *H04L 12/18*     (2006.01)
    *H04W 72/08*     (2009.01)

(52) U.S. Cl.
    CPC ....... *H04W 28/0236* (2013.01); *H04W 40/16* (2013.01); *H04W 72/005* (2013.01); *H04W 72/0446* (2013.01); *H04L 12/189* (2013.01); *H04W 72/0426* (2013.01); *H04W 72/082* (2013.01)

(56) References Cited

U.S. PATENT DOCUMENTS

| | | |
|---|---|---|
| 2013/0301512 A1 | 11/2013 | Takahashi et al. |
| 2015/0195774 A1* | 7/2015 | Lee .................. H04W 72/1226 370/312 |
| 2017/0332350 A1* | 11/2017 | Paredes Cabrera .......................... H04W 72/005 |

OTHER PUBLICATIONS

International Search Report dated Jan. 26, 2016, for corresponding International Application No. PCT/JP2015/005542, 4 pages. (With English Translation).

* cited by examiner

BASE STATION AND TRANSMISSION METHOD

TECHNICAL FIELD

The present invention is related to a base station and a transmission method.

BACKGROUND ART

[Broadcast Service Using MBSFN]

Figure 1:
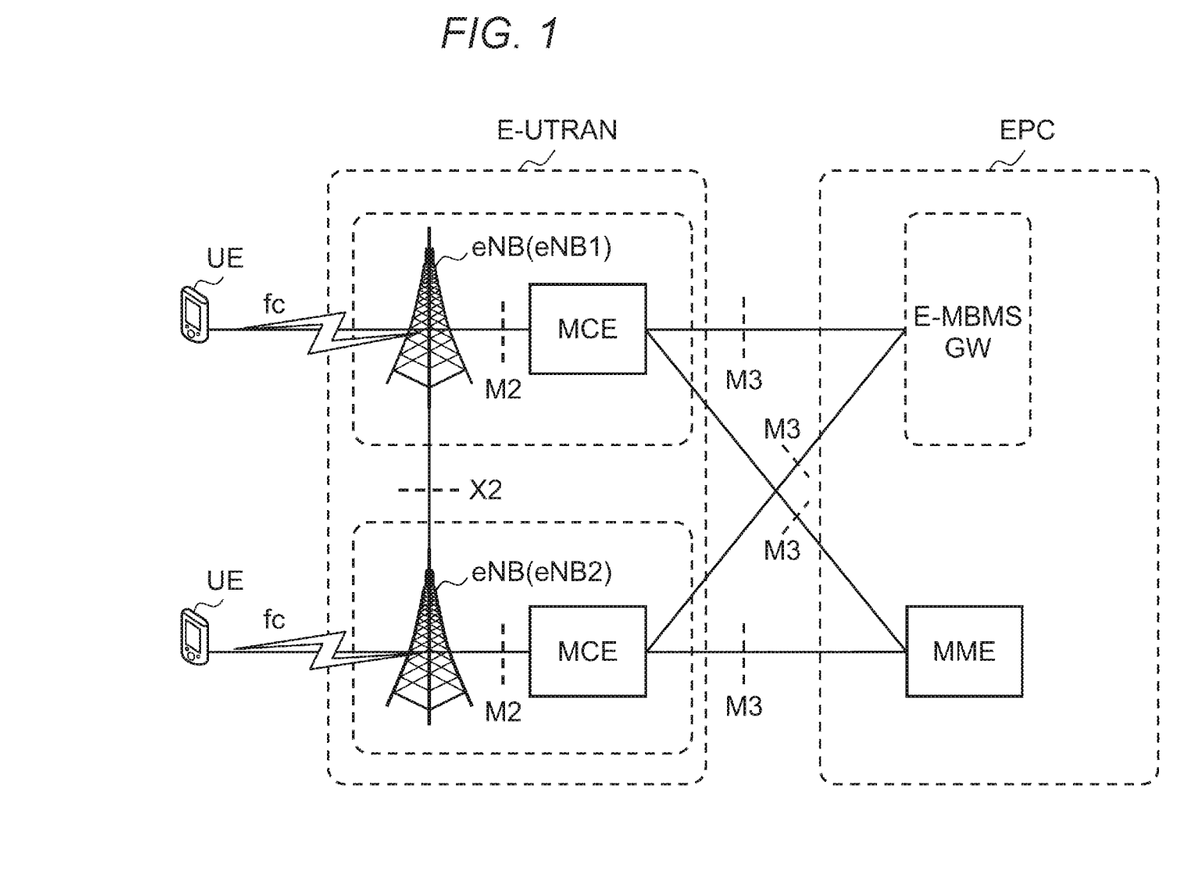
FIG. 1 is a diagram illustrating one example of architecture of MBSFN.
Figure 2:
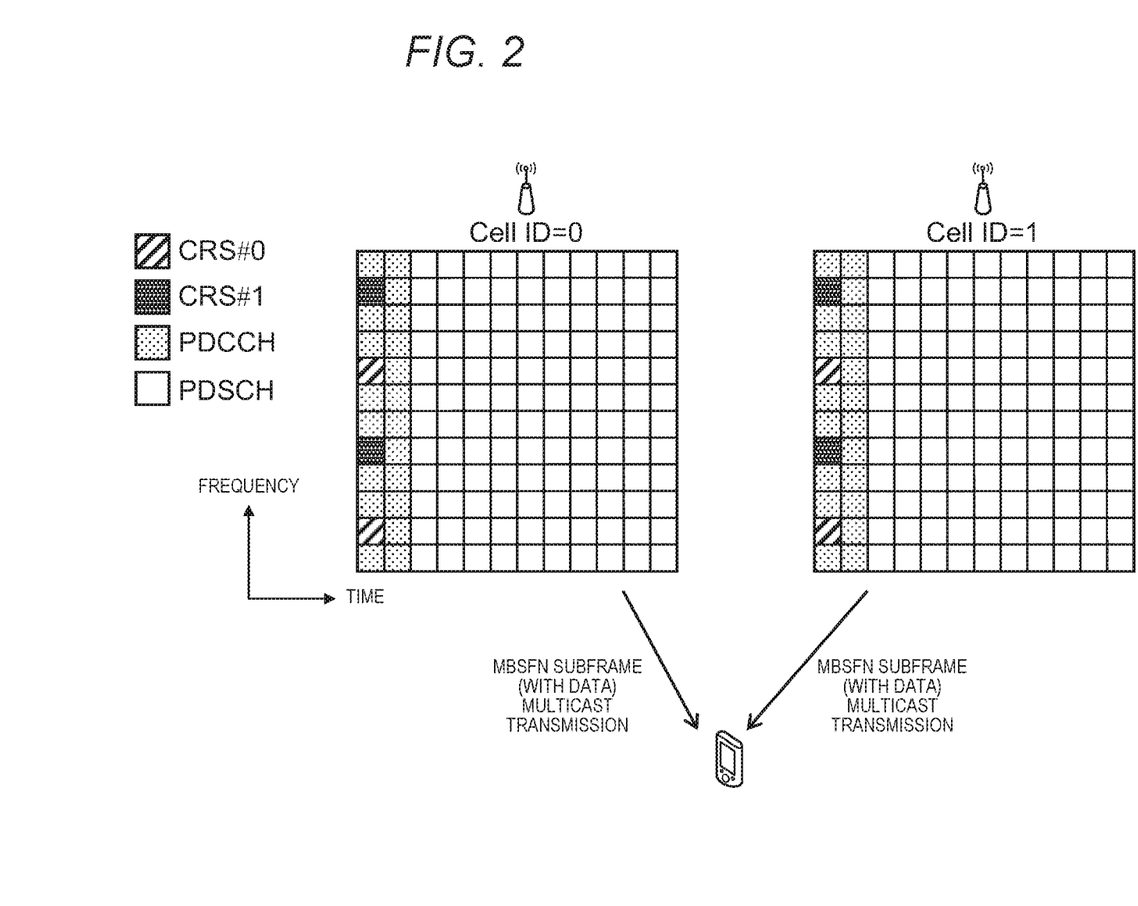
FIG. 2 is a diagram illustrating one example of a channel configuration of MBSFN subframe during multicast transmission.

In 3rd Generation Partnership Project (3GPP) which is a standardization project of a mobile communication system, Multicast Broadcast Single Frequency Network (MBSFN) is defined as one of functions of Long Term Evolution/System Architecture Evolution (LTE/SAE) (see, for example, NPL 1). FIG. 1 is a diagram illustrating one example of architecture of MBSFN. In addition, FIG. 2 is a diagram illustrating one example of a channel configuration of MBSFN subframe during multicast transmission.

As illustrated in FIG. 1, in a broadcast service using MBSFN, Multi-Cell/Multicast Coordination Entity (MCE) determines whether or not to implement a broadcast service, resources to be used for implementation, Modulation and Coding Scheme (MCS) and the like, and notifies determined information to a base station (also referred to as eNB (Evolved Universal Terrestrial Radio Network (E-UTRAN) Node B)).

In addition, each of a plurality of base stations semi-fixedly (semi-static) notifies notification/update of a subframe (hereinafter, referred to as MBSFN subframe) performing the broadcast service to a connected terminal (also referred to as User Equipment (UE)) using System Information Block (SIB). Then, as illustrated in FIG. 2, the plurality of base stations transmit the same data to the terminal using the same frequency (fc) in the MBSFN subframe.

[Interference Avoidance Technology]

In addition, in 3GPP, enhanced Inter-Cell Interference Coordination (eICIC) technology has been discussed as technology in which the plurality of base stations cooperate to implement inter-cell interference control (see, for example, NPL 1). In eICIC technology, in a case of a subframe (hereinafter, also referred to as LTE subframe) in which one base station performs data transmission (unicast transmission) in the plurality of synchronized base stations, inter-cell interference is avoided by other base stations stopping data transmission.

Further, in eICIC technology, the MBSFN subframe may be used as a subframe (referred to as Almost Blank Subframe (ABS)) for stopping data transmission.

Figure 3:
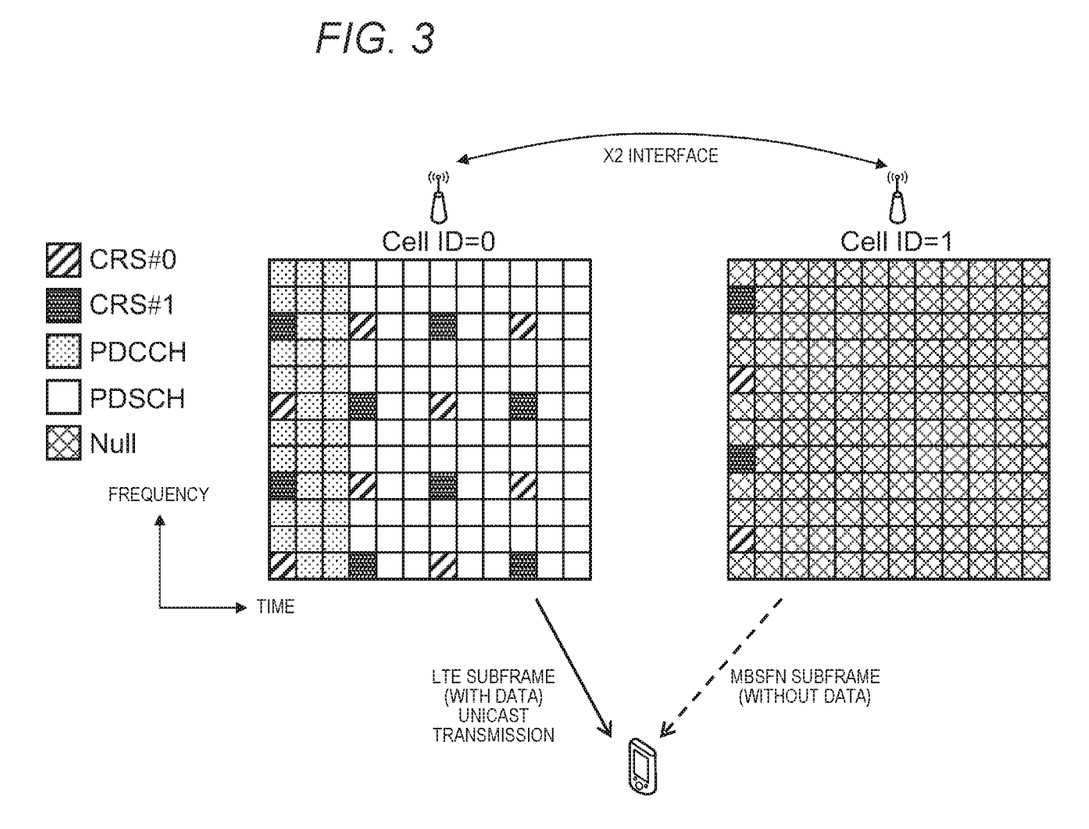
FIG. 3 is a diagram illustrating one example of a channel configuration of subframes in eICIC.

FIG. 3 illustrates an example of a channel configuration in a case where the other base station stops data transmission using the MBSF subframe during one base station is performing unicast transmission. As illustrated in FIG. 3, in a case where data transmission is stopped using the MBSFN subframe, only Cell Reference Signal (CRS) (CRS #0 in FIG. 3) is transmitted in first Orthogonal Frequency-Division Multiplexing (OFDM) symbol, a signal (Physical Downlink Shared Channel (PDSCH) or Physical Downlink Control Channel (PDCCH) is not transmitted in an area other than an area in which CRS is disposed, and the area is configured to be Null.

With this, by stopping data transmission using the MBSFN subframe, that is, by setting the user signal area to Null and transmitting only CRS, it is possible to obtain interference reduction effect more than in a case of stopping data transmission.

PTL 1 discloses a method of controlling switching between MBSFN subframe for multicast providing a broadcast service as illustrated in FIG. 2 and MBSFN subframe for interference avoidance as illustrated in FIG. 3. In PTL 1, one eNB notifies a pattern of MBSFN subframe which is information indicating MBSFN subframe and a pattern of ABS which is information indicating a subframe used for interference avoidance among MBSFN subframes to other eNB through X2 interface which is interface between eNBs. As a result, the MBSFN subframe for multicast and the MBSFN subframe for interference avoidance can be shared as different resource reservation areas between eNBs.

CITATION LIST

Patent Literature

PTL 1: Japanese Patent Unexamined Publication No. 2012-90121

Non Patent Literature

NPL 1: 3GPP TS 36.300 V10.10.0 E-UTRA and E-UTRAN overall description; stage 2 (Release 10)

SUMMARY OF THE INVENTION

However, in the case of notifying the information of the MBSFN subframe between the plurality of base stations in order to control switching of a use of the MBSFN subframe as in PTL 1, it is necessary to semi-fixedly notify the control information from the base station to the terminal by using SIB every time the use is switched. Therefore, even in a standby state (Idle state), the terminal is activated to check contents every time SIB is notified and changes from the standby state to an operation state. Therefore, the standby state time at the terminal becomes shorter.

In recent years, as a multicast, there is a case where voice data communication such as grouping call between a plurality of terminals is performed. However, since data traffic in voice data communication is not always constant, resource utilization efficiency is reduced when semi-fixed resource reservation using SIB described above is performed.

An object of one aspect of the present disclosure is to provide a base station and a transmission method in which multicast transmission and inter-cell interference coordination can be flexibly switched using the MBSFN subframe without reduction of resource utilization efficiency.

A base station according to one aspect of the present disclosure is configured to have: a determination unit which determines that a first area is used as either of a first subframe performing multicast transmission or a second subframe performing inter-cell interference coordination based on presence or absence of transmission data in each of the first area which is configured to have at least some subframes among a plurality of Multicast-Broadcast Single Frequency Network (MBSFN) subframes; and a communication unit which performs a transmission process in the first area according to a determination result of the determination unit.

A transmission method according to one aspect of the present disclosure is determining that a first area is used as either of a first subframe performing multicast transmission or a second subframe performing inter-cell interference coordination based on presence or absence of transmission data in each of the first area which is configured to have at least some subframes among a plurality of Multicast-Broadcast Single Frequency Network (MBSFN) subframes; and performing a transmission process in the first area according to a determination result of the determination unit.

According to one aspect of the present disclosure, multicast transmission and inter-cell interference coordination can be flexibly switched using the MBSFN subframe without reduction of resource utilization efficiency.

DESCRIPTION OF EMBODIMENTS

Hereinafter, an embodiment according to one aspect of the present disclosure will be described in detail with reference to drawings.

[Configuration of Communication System]

A communication system according to the embodiment of the present disclosure employs a configuration illustrated in FIG. 1. Furthermore, in following descriptions, the communication system of an LTE scheme will be described as an example, but the communication system according to the present embodiment is not limited to the LTE scheme.

In addition, in the communication system according to the embodiment of the present disclosure, multicast transmission by a plurality of eNBs using a MBSFN subframe illustrated in FIG. 1 and FIG. 2 and eICIC illustrated in FIG. 3 are performed. In eICIC, in a subframe in which one eNB is performing unicast transmission, the MBSFN subframe of another eNB is set as ABS. In addition, in the communication system according to the embodiment of the present disclosure, unicast transmission using LTE subframes by one eNB is performed.

In the communication system illustrated FIG. 1, Evolved Universal Terrestrial Radio Access (E-UTRAN) is configured to have one or a plurality of base stations (eNBs) and MCE. MCE determines resources, MCS, and the like to be used and notifies to eNB during multicast transmission. On the other hands, each of eNBs determines resources, MCS, and the like to be used based on reception quality (measurement report) notified from UE.

In addition, Evolved Packet Core (EPC) transmits and receives control data or user data to and from the plurality of the base stations (eNBs) and includes, for example, Evolved MBMS Gateway (E-MBMS GW) and Mobility Management Entity (MME).

In addition, each of eNBs is connected to EPC (for example, MME) through S1 interface (not illustrated) and performs a data exchange during unicast transmission.

Furthermore, an exchange of the control data is performed between E-UTRAN and EPC through M3 interface (control plane interface). In addition, in E-UTRAN, the control data is exchanged between eNB and MCE through M2 interface (control plane interface), and the control data is exchanged between eNBs through X2 interface.

In addition, in the present embodiment, the MBSFN subframe includes "shared area" of an eICIC/broadcast service applied as a subframe for both of multicast transmission and inter-cell interference coordination and "dedicated area" of eICIC used as only a subframe for inter-cell interference coordination.

[Configuration of Base Station]

Figure 4:
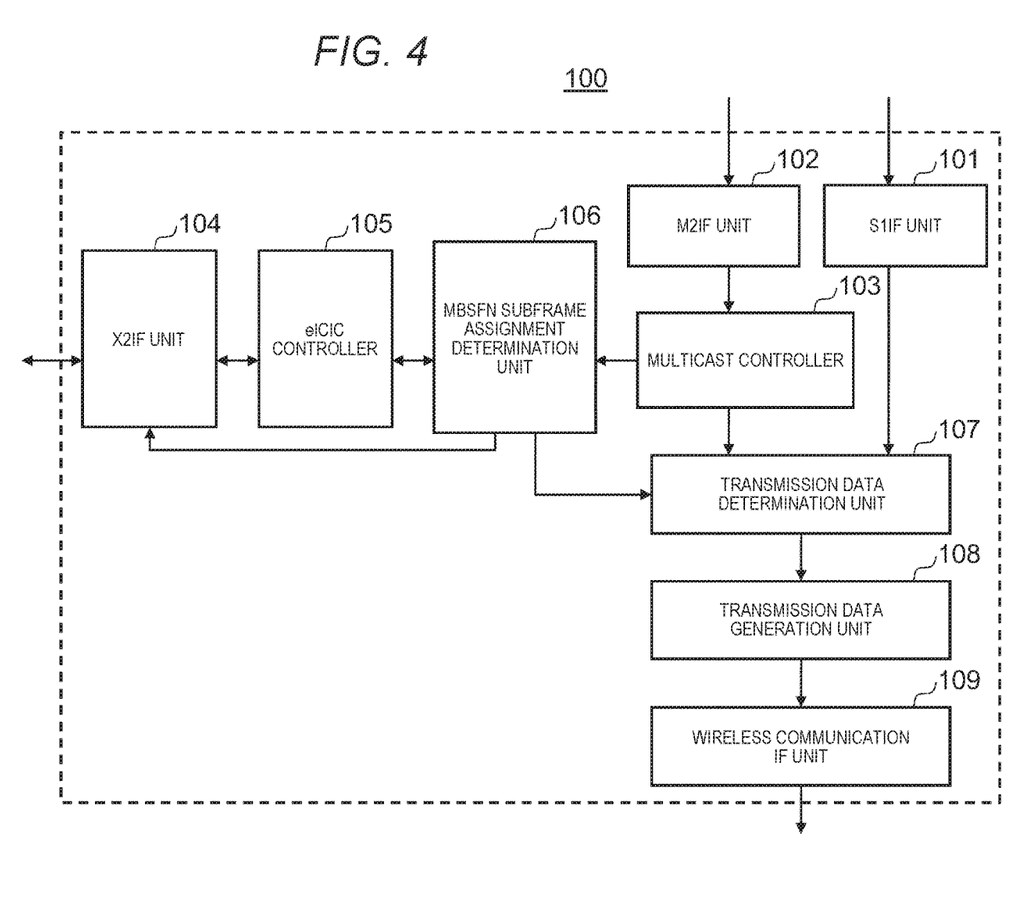
FIG. 4 is a block diagram illustrating a configuration of a base station according to an embodiment.

FIG. 4 is a block diagram illustrating a configuration of base station 100 according to the embodiment of the present disclosure. Each of eNBs in the communication system illustrated in FIG. 1 includes the configuration of base station 100 illustrated in FIG. 4.

Between two eNBs illustrated in FIG. 1, one eNB (eNB 2) determines setting information regarding assignment of the MBSFN subframe and transmits the setting information of a subframe to the other eNB (eNB 1). The assignment of the MBSFN subframe is set by eNB 1 using the received setting information of the subframe.

For example, eNB 2 is an eNB which covers a macro cell, and eNB 1, that is, an eNB which sets the assignment of the MBSFN subframe using the setting information of the subframes is an eNB which covers a pico cell (also referred to as Femto cell) disposed in the macro cell.

Base station 100 illustrated in FIG. 4 includes S1 IF (interface) unit 101, M2 IF unit 102, multicast controller 103, X2 IF unit 104, eICIC controller 105, MBSFN subframe assignment determination unit 106, transmission data determination unit 107, transmission data generation unit 108, and wireless communication IF unit 109.

S1 IF unit 101 receives unicast data from MME through S1 interface and outputs the received data to transmission data determination unit 107.

M2 IF unit 102 receives the control data or user data which is data regarding multicast transmission from MCE through M2 interface and outputs to multicast controller 103. The control data is, for example, MBMS scheduling information indicating which subframes are used as the MBSFN subframe or the like. The user data is referred to as multicast data or MBMS data.

Multicast controller 103 outputs the control data to MBSFN subframe assignment determination unit 106 and outputs the user data to transmission data determination unit 107.

X2 IF unit 104 transmits and receives the setting information of the subframes from other eNB through X2 interface. The setting information of the subframes is, for example, information indicating a pattern of subframes set as the MBSFN subframe, information indicating a pattern of subframes set as the shared area of the eICIC/broadcast service, and the setting information indicating whether each of the plurality of the base stations performing eICIC is a base station which transmits the unicast data or a base station which does not perform data transmission (hereinafter, referred to as interference stop base station).

In a case where base station 100 is eNB 2, eICIC controller 105 determines a subframe which is set as a subframe for interference avoidance (ABS). Then, eICIC controller 105 outputs the determined setting information of the subframe to MBSFN subframe assignment determination unit 106 and transmits the setting information to eNB 1 through X2 IF unit 104.

In addition, in a case where base station 100 is eNB 1, eICIC controller 105 outputs information of the subframe for interference avoidance (ABS) received from eNB 2 through X2 IF unit 104 to MBSFN subframe assignment determination unit 106.

In a case where base station 100 is eNB 2, MBSFN subframe assignment determination unit 106 determines assignment of the MBSFN subframe based on the MBMS scheduling information of multicast transmission received from multicast controller 103 and the setting information of the subframe for interference avoidance in eICIC received from eICIC controller 105.

Specifically, MBSFN subframe assignment determination unit 106 determines a subframe which is also set to a subframe for interference avoidance in eICIC as "shared area" of the eICIC/broadcast service or "dedicated area" of eICIC among subframes which are set the MBSFN subframe shown in the MBMS scheduling information of multicast transmission.

In addition, MBSFN subframe assignment determination unit 106 determines a subframe other than the subframes which are set subframes for interference avoidance in eICIC as an area of the broadcast service among the subframes which are set as the MBSFN subframe.

MBSFN subframe assignment determination unit 106 outputs a result of assignment of the MBSFN subframe to transmission data determination unit 107 and transmits the result of assignment to eNB 2 through X2 IF unit 104.

In addition, in a case where base station 100 is eNB 1, MBSFN subframe assignment determination unit 106 receives the result of assignment of the MBSFN subframe from eNB 2 and sets assignment of MBSFN based on the received result of assignment.

Transmission data determination unit 107 determines types (multicast data, unicast data, or none of data) of data transmitted in each of the subframes based on the result of assignment of the MBSFN subframe received from MBSFN subframe assignment determination unit 106, presence or absence of the multicast data received from multicast controller 103, and presence or absence of the unicast data received form S1 IF unit 101. As a result of determination, in a case where data transmission is performed, transmission data determination unit 107 outputs the multicast data or the unicast data to transmission data generation unit 108. Details of determination processes of transmission data in transmission data determination unit 107 will be described later.

Transmission data generation unit 108 performs an encoding process and modulation process according to data received from transmission data determination unit 107 and generates the transmission data. Transmission data generation unit 108 outputs the generated transmission data to wireless communication IF unit 109.

Wireless communication IF unit 109 performs wireless transmission process on the transmission data received from transmission data generation unit 108 and transmits the transmission data to a terminal (UE) after the wireless transmission process.

[Operation of Communication System]

Next, an operation example of the communication system according to the embodiment of the present disclosure described above will be described in detail.

[Signaling of Information in Plurality of Base Station]

Figure 5:
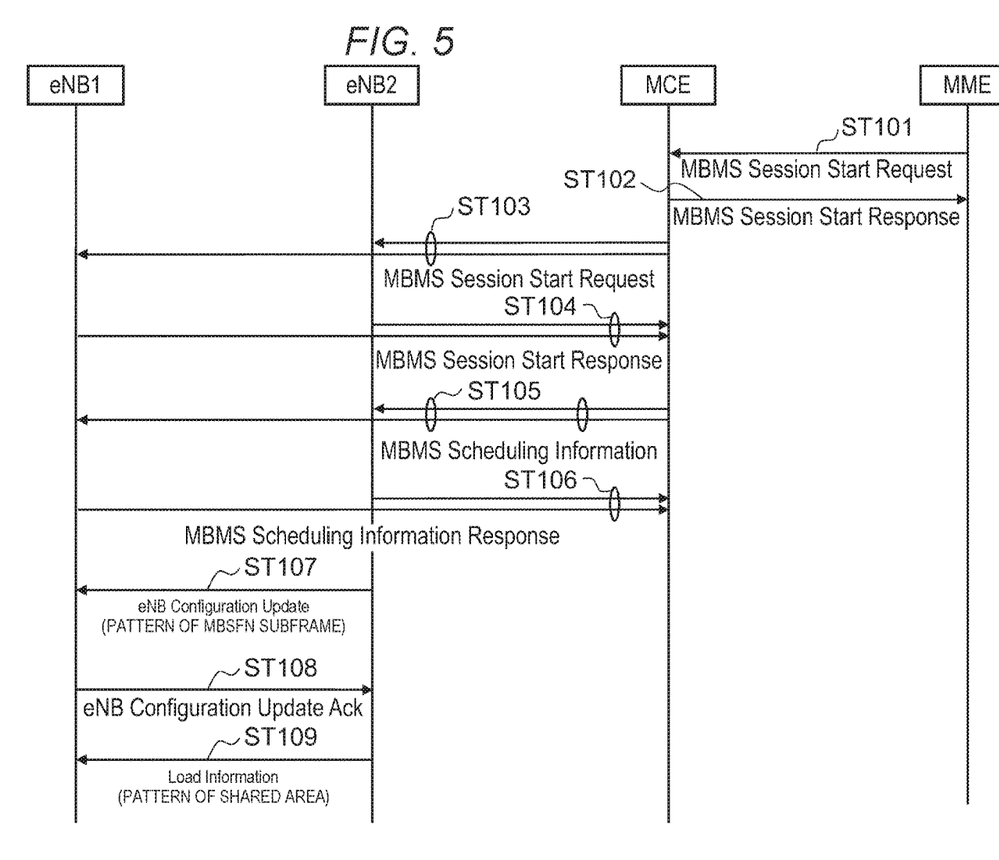
FIG. 5 is a diagram illustrating one example of network negotiations according to the embodiment.

First, signaling of information between the plurality of base stations performing eICIC will be described. FIG. 5 is a sequence diagram illustrating one example of network negotiations in the communication system. In a configuration in FIG. 5, two eNBs correspond to one MCE. With reference to FIG. 5, an operation between MME, MCE, and eNB 1 and eNB 2 which are two eNBs will be described.

Furthermore, as shown in FIG. 1, one MCE may correspond to one eNB, and not only two eNBs but also two or more eNBs may correspond to one MCE as shown in FIG. 5.

In FIG. 5, in step (hereinafter, referred to as "ST") 101, MME transmits a request to start provision of the broadcast service (MBMS Session Start Request) to MCE.

In ST 102, when accepting the request received in ST 101, MCE transmits a response (MBMS Session Start Response) with respect to the request to MME.

In ST 103, MCE transmits the request to start provision of the broadcast service (MBMS Session Start Request) to eNB 1 and eNB 2.

In ST 104, when accepting the request received in ST 103, eNB 1 and eNB 2 transmit the response (MBMS Session Start Response) with respect to the request to MCE.

In ST 105, as an initial setting, MCE transmits the MBMS scheduling information indicating setting information such as MCCH (Multicast Control Channel: logical channel) and PMCH (Physical Multicast Channel: physical channel) used for multicast transmission between eNB and UE to eNB 1 and eNB 2.

In ST 106, when receiving the MBMS scheduling information received in ST 105, eNB 1 and eNB 2 transmit the response (MBMS Scheduling Information Response) with respect to the MBMS scheduling information to MCE.

In ST 107, eNB 2 transmits the setting information (eNB Configuration Update) including the pattern of the MBSFN subframe determined by MBSFN subframe assignment determination unit 106 to eNB 1.

In ST 108, eNB 1 updates the MBSFN subframe based on the setting information received in ST 107 and transmits the response (eNB Configuration Update Ack) to eNB 2.

In ST 109, eNB 2 transmits the setting information (Load Information) including the pattern of the shared area of the eICIC/broadcast service to eNB 1.

In this manner, information indicating an area which is the MBSFN subframe and information indicating the shared area of the eICIC/broadcast service are shared by signaling of ST 107 to ST 109 between two base stations eNB 1 and eNB 2.

Based on the setting information (eNB Configuration Update) received in ST 107 and the setting information (Load Information) received in ST 109, eNB 1 sets assignment of the MBSFN subframe, that is, assignment of the shared area of the eICIC/broadcast service and the dedicated area of eICIC. For example, eNB 1 specifies the subframe other than the subframes which are set as the shared area of the eICIC/broadcast service shown in the setting information (Load Information) received in ST 109 and the subframe which is set as the dedicated area of eICIC among the MBSFN subframes shown in the setting information (eNB Configuration Update) received in ST 107.

Furthermore, as a message used during transmission of the setting information of the pattern of the shared area of the eICIC/broadcast service of ST 109 and the setting information of the pattern of the MBSFN subframe of ST 107, other message of, for example, Setup Request or the like may be used without being limited to eNB Configuration Update or Load Information.

In addition, in ST 109, eNB 2 may notify the pattern of the dedicated area of eICIC instead of the shared area of the eICIC/broadcast service to eNB 1 and may notify both patterns of the shared area of the eICIC/broadcast service and the dedicated area of eICIC to eNB 1.

After network negotiations, eNB1 and eNB2 notify the MBSFN subframe information which is set to connected UE using, for example, SIB.

The plurality of the subframes which are set as the MBSFN subframe includes the shared area of the eICIC/broadcast service and the dedicated area of eICIC by above network negotiations.

Figure 6:
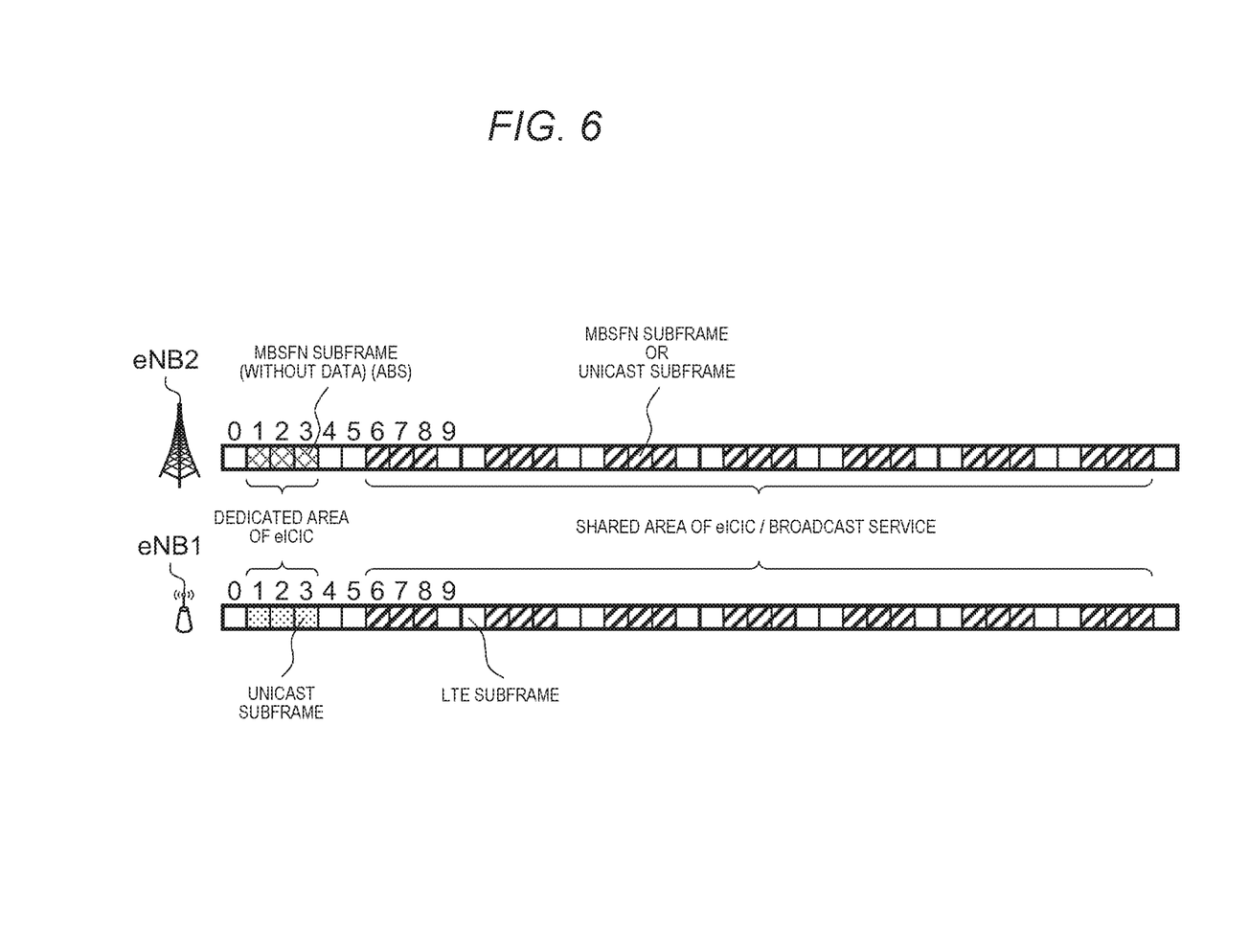
FIG. 6 is a diagram illustrating one configuration example of subframes according to the embodiment.

FIG. 6 is a diagram illustrating a setting example of the shared area of the eICIC/broadcast service and the dedicated area of eICIC of the subframe of each of eNB 1 and eNB 2. The subframe of each of eNB 1 and eNB 2 includes the shared area of the eICIC/broadcast service and the dedicated area of eICIC.

As illustrated in FIG. 6, the shared area of the eICIC/broadcast service of eNB 1 and eNB 2 is used by switching to either of the MBSFN subframe which performs multicast transmission or the subframe which performs only eICIC.

That is, eNB 1 and eNB 2 use SIB to notify the shared area of the eICIC/broadcast service illustrated in FIG. 6 only once to UE and adaptively switch a use of the subframe of the shared area of the eICIC/broadcast service, thereafter. As a result, eNB 1 and eNB 2 can switch the use of the shared area of eICIC/broadcast service without performing the notification to UE using SIB and the notification between the base stations using X2 interface.

On the other hand, in FIG. 6, in the dedicated area of eICIC of eNB 1 and eNB 2, one eNB (eNB 2 in FIG. 6) sets each of the subframes as ABS, transmits only CRS using the MBSFN subframe, and stops data transmission. In addition, the other eNB (eNB 1 in FIG. 6) sets each of the subframes as a unicast subframe and transmits the unicast data to UE. In addition, eNB1 measures reception quality with respect to UE and receives a reception quality report (measurement report). That is, the received reception quality report is reception quality of UE in a state where there is no interference.

That is, eNB 1 and eNB 2 fixedly use the subframes included in the dedicated area of eICIC as a subframe for eICIC. As a result, eNB 1 can receive a measurement result of reception quality in an environment where inter-cell interference is suppressed from UE.

[Determination Process of Transmission Data]

Figure 7:
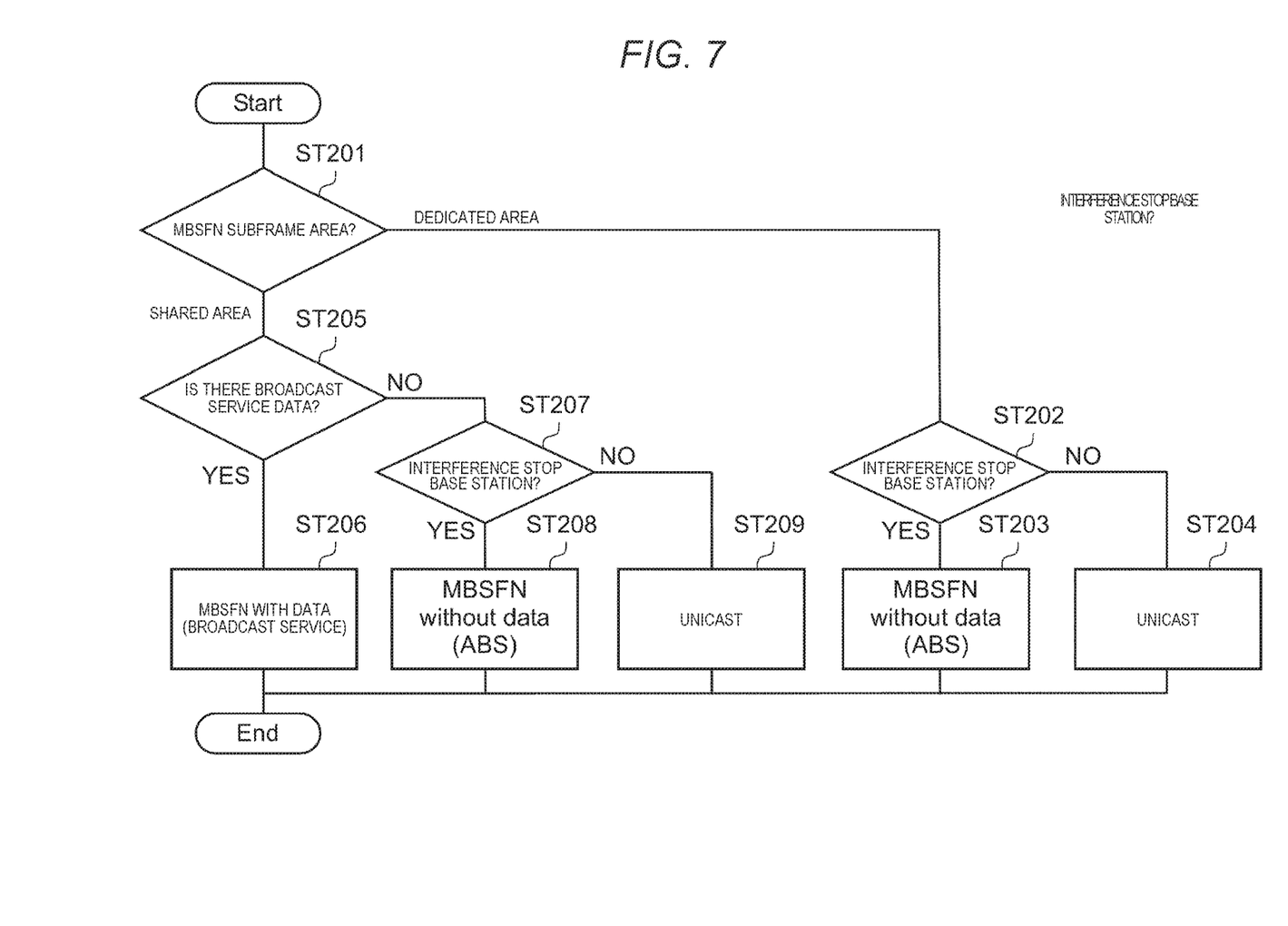
FIG. 7 is a flowchart illustrating a determination process of transmission data according to the embodiment.

FIG. 7 is a flowchart illustrating a determination process of transmission data of the MBSFN subframe in transmission data determination unit 107 of base station 100.

In FIG. 7, transmission data determination unit 107 determines whether the MBSFN subframe of a transmission target is in the dedicated area of the eICIC or in the shared area of the eICIC/broadcast service based on the result of assignment received from MBSFN subframe assignment determination unit 106 in ST 201.

In ST 201, in a case (case of "dedicated area") where the MBSFN subframe is in the dedicated area of eICIC, ST 201 is processed to ST 202, and in ST 202, transmission data determination unit 107 determines whether or not base station 100 as own base station is in "interference stop base station", that is, whether or not to transmit the data.

Furthermore, each of base stations shares in advance the setting information indicating whether each of the plurality of base stations performing eICIC is a base station which transmits the unicast data or an interference stop base station which is a base station which does not perform data transmission.

In ST 202, in a case (case of YES) where base station 100 as own base station is the interference stop base station, ST 202 is processed to ST 203, and in ST 203, transmission data determination unit 107 determines whether or not the MBSFN subframe of the transmission target is ABS in eICIC. That is, transmission data determination unit 107 determines that there is no transmission data transmitted in the MBSFN subframe of the transmission target.

In ST 202, in a case (case of NO) where base station 100 as own base station is not the interference stop base station, ST 202 is processed to ST 204, and in ST 204, transmission data determination unit 107 determines that the MBSFN subframe of the transmission target is the unicast subframe. That is, transmission data determination unit 107 determines that the transmission data transmitted in the MBSFN subframe of the transmission target is the unicast data.

On the other hands, in ST 201, in a case (case of "shared area") where the MBSFN subframe is in the shared area of the eICIC/broadcast service, ST 201 is processed to ST 205, and in ST 205, transmission data determination unit 107 determines whether or not there is the multicast data (broadcast service data) to be transmitted in the MBSFN subframe of the transmission target.

In ST 205, in a case (case of YES) where there is the multicast data, ST 205 is processed to ST 206, and in ST 206, transmission data determination unit 107 determines that the MBSFN subframe of the transmission target is used for multicast transmission. That is, transmission data determination unit 107 determines that the transmission data transmitted in the MBSFN subframe of the transmission target is the multicast data.

In ST 205, in a case (case of NO) where there is no multicast data, ST 205 is processed to ST 207, and in ST 207, transmission data determination unit 107 determines that the MBSFN subframe of the transmission target is the MBSFN subframe used for eICIC. Then, in ST 207, transmission data determination unit 107 determines whether or not base station 100 as own base station is the interference stop base station. In a case (case of YES) where base station 100 as own base station is the interference stop base station, the step is processed to ST 208, and in ST 208, transmission data determination unit 107 determines that there is no transmission data transmitted in the MBSFN subframe of the transmission target. On the other hands, in ST 207, in a case (case of NO) where base station 100 as own base station is not the interference stop base station, ST 207 is processed to ST 209, and in ST 209, transmission data determination unit 107 determines that the transmission data transmitted in the MBSFN subframe of the transmission target is the unicast data.

Here, since MCE notifies transmission of the same multicast data with respect to the same resource to the plurality of eNBs performing multicast transmission, the plurality of eNBs performing multicast transmission share presence or absence of the multicast data in the MBSFN subframe of the transmission target. Therefore, transmission data determination units 107 of the plurality of eNBs can perform the determination process of ST 205 according to the same standard.

Then, wireless communication IF unit 109 performs a transmission process in the shared area of the eICIC/broadcast service according to the determination result of transmission data determination unit 107 described above.

As described above, in the present embodiment, at least some subframes of the MBSFN subframes are set to the shared area of the eICIC/broadcast service which is a subframe capable of using in both of the subframe for multicast transmission and the subframe for eICIC. Then, based on presence or absence of the multicast data in each of the subframes of the shared area, base station 100 determines that the shared area of the eICIC/broadcast service is used as either of the subframe performing multicast transmission or the subframe performing eICIC. That is, base station 100 adaptively switches a use of the shared area of the eICIC/broadcast service according to presence or absence of the multicast data. Then, base station 100 transmits the transmission data in the shared area of the eICIC/broadcast service of which the use has been determined.

As a result, base station 100 can flexibly switch between multicast transmission and interference avoidance transmission in the shared area of the eICIC/broadcast service according to presence or absence of the transmission data. That is, base station 100 can switch between multicast transmission and interference avoidance transmission without notifying control information (such as SIB) to other eNB or UE every time the use of the MBSFN subframe is changed.

In addition, even when voice communication such as grouping call is performed as multicast transmission, base station 100 uses the shared area of the eICIC/broadcast service for the subframe of multicast transmission in a case where there is voice data as multicast data and in a case where there is no voice data, the shared area of the eICIC/broadcast service can be used for other uses other than multicast transmission, such as ABS or the unicast subframe. In a case where there is no voice data, base station 100 can use the shared area of the eICIC/broadcast service for transmission of the unicast data.

As described above, since base station 100 can flexibly switch the use of the shared area of eICIC broadcast service without using a notification such as SIB according to presence or absence of the voice data of which data traffic is not always constant, resource utilization efficiency of the MBSFN subframe can be improved.

Therefore, according to the present embodiment, multicast transmission and inter-cell interference coordination can be flexibly switched using the MBSFN subframe without reduction of resource utilization efficiency.

Furthermore, according to the present embodiment, a part of the MBSFN subframe is set as the dedicated area of eICIC. That is, base station 100 can perform eICIC regardless of presence or absence of the multicast data in the dedicated area of eICIC. With this, it is possible for some eNBs to transmit only CRS using the MBSFN subframe and to ensure a situation of stopping data transmission, so that report of reception quality in a state where there is no interference from other eNBs to UE can reliably be carried out.

MODIFICATION EXAMPLES OF EMBODIMENT

[1] A case where the use of the shared area of the eICIC/broadcast service is determined depending on presence or absence of the multicast data is described in the above embodiment. That is, in the above embodiment, a case where the broadcast service is prior to eICIC has been described. However, a service which is prior to the shared area of the eICIC/broadcast service is not limited to the broadcast service and unicast transmission may be prioritized. For example, in a case of giving priority to unicast transmission, transmission data determination unit 107 determines whether or not there is the unicast data in ST 205 illustrated in FIG. 7. If there is the unicast data, ST 205 is processed to ST 207, and if there is no unicast data, ST 205 is processed to ST 206. Furthermore, in a case of giving priority to unicast transmission, information on presence or absence of the unicast data in each of base stations 100 is shared between base stations 100 using, for example, X2 interface.

Alternatively, in multicast transmission and unicast transmission, priorities for using the shared area of the eICIC/broadcast service may be set in advance to the plurality of different services. Specifically, between multicast transmission and unicast transmission, one of the priorities is set high as described above, and priority is also set between different transmission services in each of multicast transmission and unicast transmission. For example, different transmission services can be a voice service, a video data service, and the like. In this case, the voice service may be prior to the video data service.

[2] In the above embodiment, a case where the MBSFN subframe includes "shared area of eICIC/broadcast service" and "dedicated area of eICIC" has been described. However, the MBSFN subframe is not limited to a case where "shared area of eICIC/broadcast service" and "dedicated area of eICIC" are included and may include "dedicated area of broadcast service".

The base station 100 transmits the multicast data in the dedicated area of the broadcast service regardless of presence or absence of other transmission data. By providing the dedicated area of the broadcast service in this manner, since resources for ensuring the broadcast service in base station 100 are secured, a lowest transmission rate in the broadcast service can be guaranteed.

[3] In the above embodiment, a case where one eNB is set to the interference stop base station in eICIC and the other eNB is set to a base station which preferentially transmits the unicast data has been described. eNB set as the interference stop base station may be fixedly set in advance or may be switched according to an instruction from an upper layer, or may be switched in the plurality of eNBs every predetermined period.

[4] In the above embodiment, a case where the present invention is constituted by hardware is described as an example, but the present invention can be realized by software in cooperation with hardware.

Furthermore, each of functional block used in a description of the above embodiment is typically realized as LSI (Large-Scale Integration) which is an integrated circuit. These may be separately formed into one chip or may be integrated into one chip so as to include some or all of them. Here, although it is LSI, it may be referred to as IC (Integrated Circuit), system LSI, super LSI, or ultra LSI depending on a degree of integration.

In addition, a method of integrated circuitization is not limited to LSI and may be realized by a dedicated circuit or a general-purpose processor. FPGA (Field Programmable Gate Array) capable of being programmed after LSI manufacturing and a reconfigurable processor capable of reconfiguring connection and setting of circuit cells inside LSI may be used.

Furthermore, if integrated circuit technology replacing LSI is introduced due to advances in semiconductor technology or other derived technologies, of course, functional block integration may be performed using the technology. Biotechnology or the like can be applied.

INDUSTRIAL APPLICABILITY

One aspect of the present disclosure can be applied to a mobile communication system or the like.

REFERENCE MARKS IN THE DRAWINGS 100 base station
101 S1 IF unit
102 M2 IF unit
103 multicast controller
104 X2 IF unit
105 eICIC controller
106 MBSFN subframe assignment determination unit
107 transmission data determination unit
108 transmission data generation unit
109 wireless communication IF unit

The invention claimed is:

1. A base station comprising:
determination circuitry which, in operation, determines that each subframe of a shared area is used to perform multicast transmission or is used to perform inter-cell interference coordination based on presence or absence of transmission data to be transmitted in each subframe of the shared area, the shared area being configured to have subframes used to perform both multicast transmission and inter-cell interference coordination among a plurality of Multicast-Broadcast Single Frequency Network (MBSFN) subframes; and
communication circuitry which, in operation, performs a transmission process in the shared area according to a determination result of the determination circuitry.

2. The base station of claim 1, wherein:
when transmission data in a subframe in the shared area includes multicast data, the determination circuitry determines the subframe is used to perform multicast transmission, and
when the transmission data in the subframe in the shared area does not include multicast data, the determination circuitry determines the subframe is used to perform inter-cell interference coordination.

3. The base station of claim 1, further comprising:
inter base station communication circuitry which, in operation, transmits setting information indicating whether each of the base station and another base station performing inter-cell interference coordination transmits unicast data or does not transmit the unicast data,
wherein the determination circuitry determines whether to transmit the unicast data to perform inter-cell interference coordination based on the setting information.

4. The base station of claim 1, wherein the MBSFN subframes further include:
a dedicated area which is configured to have other subframes other than the shared area among the MBSFN subframes and to be used only for inter-cell interference coordination.

5. The base station of claim 4, wherein first information indicating an area which includes the MBSFN subframes and second information indicating the shared area are shared between the base station and another base station by signaling, the base station further comprising:
determination circuitry which, in operation, determines the dedicated area based on the first information and the second information.

6. The base station of claim 4, wherein first information indicating an area which includes the MBSFN subframes and third information indicating the dedicated area are shared between the base station and another base station by signaling, the base station further comprising:
determination circuitry which, in operation, determines the shared area based on the first information and the third information.

7. The base station of claim 1, wherein:
when transmission data in a subframe in the shared area includes voice data simultaneously transmitted to a plurality of terminals, the determination circuitry determines the subframe is used to perform multicast transmission, and
when the transmission data in the subframe in the shared area does not include the voice data, the determination circuitry determines the subframe is used to perform inter-cell interference coordination.

8. The base station of claim 1, wherein:
when transmission data in a subframe in the shared area includes unicast data, the determination circuitry determines the subframe is used to perform inter-cell interference coordination, and
when the transmission data in the subframe in the shared area does not include unicast data, the determination circuitry determines the subframe is used to perform multicast transmission.

9. A transmission method comprising:
determining that each subframe of a shared area is used to perform multicast transmission or is used to perform inter-cell interference coordination based on presence or absence of transmission data to be transmitted in each subframe of the shared area, the shared area being configured to have subframes used to perform both multicast transmission and inter-cell interference coordination among a plurality of Multicast-Broadcast Single Frequency Network (MBSFN) subframes; and
performing a transmission process in the shared area according to a result of the determining.

10. The transmission method of claim 9, wherein:
when transmission data in a subframe in the shared area includes multicast data, the determining includes determining that the subframe is used to perform multicast transmission, and
when the transmission data in the subframe in the shared area does not include multicast data, the determining includes determining that the subframe is used to perform inter-cell interference coordination.

11. The transmission method of claim 9, further comprising:
determining whether to transmit unicast data to perform inter-cell interference coordination based on setting information indicating whether each of a plurality of base stations performing inter-cell interference coordination transmits unicast data or does not transmit the unicast data.

12. The transmission method of claim 9, wherein the MBSFN subframes further include:
a dedicated area which is configured to have other subframes other than the shared area among the MBSFN subframes and to be used only for inter-cell interference coordination.

13. The transmission method of claim 12, further comprising:
determining the dedicated area based on first information indicating an area which includes the MBSFN subframes and second information indicating the shared area.

14. The transmission method of claim 12, further comprising:
    determining the shared area based on first information indicating an area which includes the MBSFN subframes and third information indicating the dedicated area.

15. The transmission method of claim 9, wherein:
    when transmission data in a subframe in the shared area includes voice data simultaneously transmitted to a plurality of terminals, the determining includes determining that the subframe is used to perform multicast transmission, and
    when the transmission data in the subframe in the shared area does not include the voice data, the determining includes determining that the subframe is used to perform inter-cell interference coordination.

16. The transmission method of claim 9, wherein:
    when transmission data in a subframe in the shared area includes unicast data, the determining includes determining that the subframe is used to perform inter-cell interference coordination, and
    when the transmission data in the subframe in the shared area does not include unicast data, the determining includes determining that the subframe is used to perform multicast transmission.

* * * * *